June 23, 1936.     A. G. COOLEY     2,045,294
SYNCHRONIZING APPARATUS FOR PHOTO-TELEGRAPHY
Original Filed Dec. 11, 1924
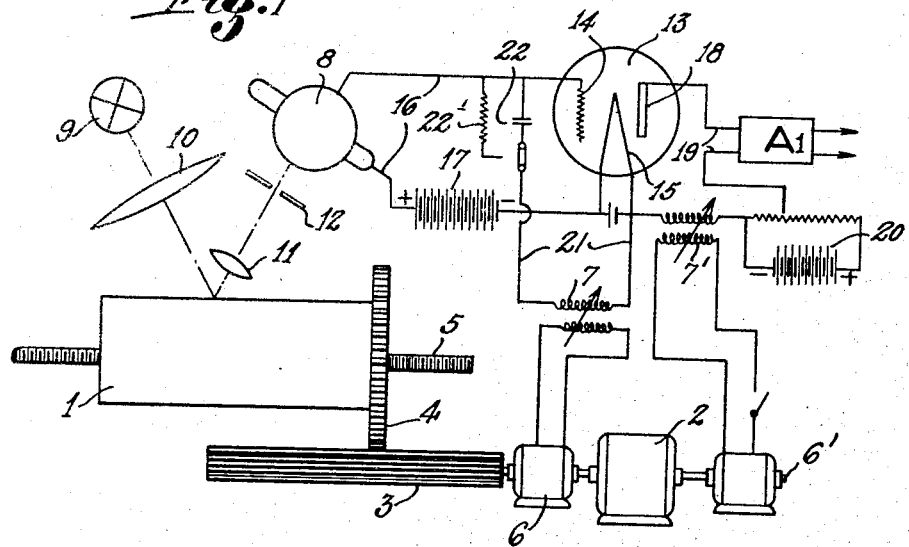
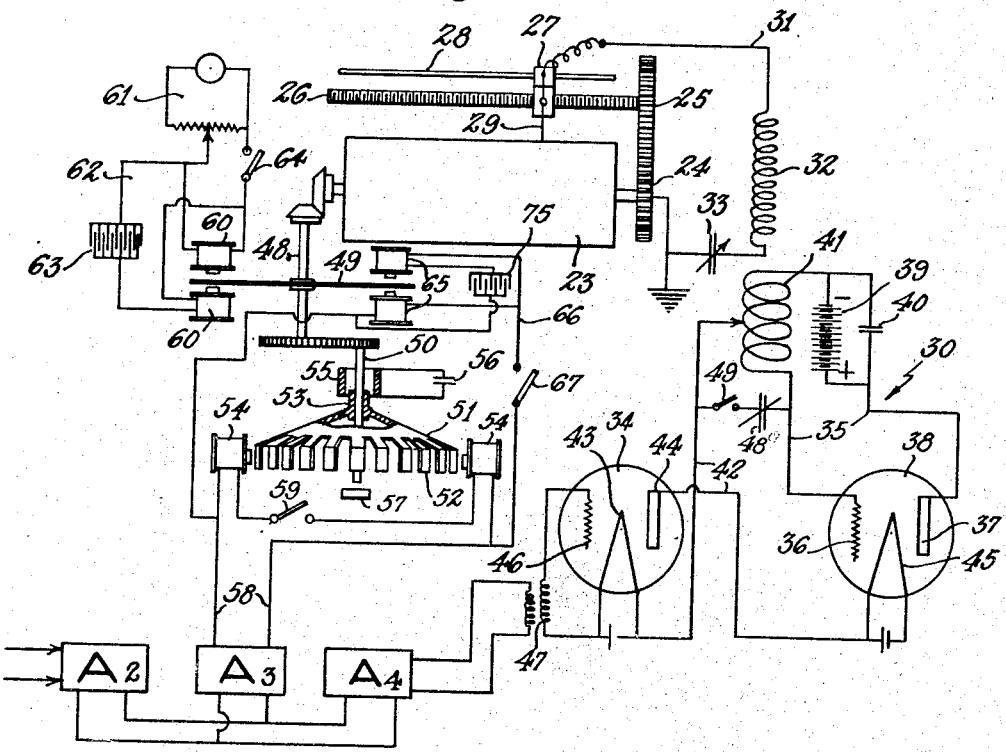
Austin G. Cooley
INVENTOR
BY
Darby & Darby
ATTORNEYS Patented June 23, 1936

2,045,294

UNITED STATES PATENT OFFICE 2,045,294

SYNCHRONIZING APPARATUS FOR PHOTO-TELEGRAPHY

Austin G. Cooley, New York, N. Y., assignor, by mesne assignments, to Radio Corporation of America, a corporation of Delaware Original application December 11, 1924, Serial No. 755,336, now Patent No. 2,015,742, dated October 1, 1935. Divided and this application December 22, 1931, Serial No. 582,550

8 Claims. (Cl. 178—69.5)

This invention relates to photo-telegraphic apparatus of the type wherein the light values of the subject matter affect the transmitted power so that the light values are reproduced at the receiving station in corresponding time and space relation, and particularly to apparatus for synchronizing the transmitting and receiving units such as, for example, rotating carriers for the photographic or printed matter to be transmitted and received.

In one aspect the invention comprises apparatus for sending with alternating or other varying current, the transmitter being driven at a rate proportional to a power frequency, the subject-matter being transmitted by varying the amplitude of the aforesaid current or power; and apparatus for operating the receiver apparatus at a speed proportional to the frequency of said current or power together with means for applying driving forces to the receiver independently of the transmitted power.

In a more specific aspect the invention comprises apparatus for sending with alternating or other pulsating current, the transmitting carrier or transmitter being driven by the source of the current energy or otherwise at a rate proportional to the frequency of the current and the subject-matter being transmitted by varying the pulsating current, apparatus for driving the receiving carrier or receiver at a speed proportional to said frequency and therefore in synchronism with the transmitting carrier, motive means for applying driving force to the receiver independently of the pulsating transmitting current, and regulating means responsive to the impulses of said pulsating current for synchronizing the receivers with the current frequency and therefore with the transmitter. Said motive means, which may be an electric motor or other motor, preferably applies to the receiving carrier an approximately constant driving force sufficient to overcome its average resistance, and said regulating means therefore requires only a small amount of energy to synchronize the carrier. When the regulating means is in the form of a coil inductively associated with the rotor of said motor or with an associated rotor it functions as motive means to apply advancing force when the receiver tends to lag and to apply retarding force when the receiver tends to move too fast, the coil deriving its energy from said pulsating transmitting current or current controlled thereby.

For the purpose of illustration one concrete embodiment of the genus of the invention is shown diagrammatically in the accompanying drawing in which—

Fig. 1 indicates the transmitting apparatus; and
Fig. 2 indicates the receiving apparatus.

In the particular embodiment of the invention chosen for the purpose of illustration the transmitting apparatus comprises a drum 1 upon which the photograph, printed matter or the like, is wrapped, a motor 2 for rotating the drum through gears 3 and 4, the drum threading axially on a stationary shaft 5 as it rotates, a generator 6 for supplying alternating current to variable transformer 7 at a suitable frequency (say 1000 cycles or higher) which is proportional to the speed of drum 1, a photo-electric cell 8, a light source 9, lenses 10 and 11 for focusing upon said cell through apertured plate 12 a pencil of light reflected from the photograph or the like, an audion 13 having its grid 14 and cathode 15 connected to said cell through an input circuit 16 containing a source of potential 17, and having its cathode and anode 18 connected to an output circuit 19 containing a variable source 20, and an amplifier A1 interposed in the output circuit. This amplifier, as well as the amplifiers hereinafter referred to, may be of audion or other suitable type. The transformer 7 is connected across the input circuit 16 by circuit 21 containing a low capacity (e. g. 0.00001 m. f.) condenser 22, or high resistance 22', (e. g. of the order of five to twenty-five megohms, preferably the latter, depending on the type of audion, etc.).

The receiving apparatus shown in Fig. 2 comprises a drum 23 which rotates without endwise progression, this drum carrying sensitized paper or other suitable recording media. Connected to the drum through gears 24 and 25 is a threaded shaft 26 along which travels a head 27, the head having an opening to receive stationary rod 28 which restrains the head from turning with the shaft. Head 27 carries a needle 29 for directing an electronic discharge to the sheet wound on drum 23. This discharge is produced by an oscillating circuit 30 feeding into circuit 31 containing coil 32 and condenser 33, the oscillating circuit being controlled by the aforesaid transmitting station working through amplifiers A2 and A4 and a modulator 34.

The oscillator comprises a circuit 35 connected to the grid 36 and anode 37 of audion 38 and containing battery 39, condenser 40 and coil 41, the latter being inductively associated with coil 32. The output circuit 42 from the cathode 43 and anode 44 of modulator 34 is connected between the coil 41 and cathode 45 of audion 38, the grid 46 of the modulator being connected to amplifier A4, through transformer 47. A condenser 48 may be connected in the circuits by switch 49 but is ordinarily not required.

Geared to the drum 23 is a shaft 48 carrying a conducting disk 49 and geared to shaft 48 is a shaft 50 carrying a conical rotor 51 of paramagnetic material, the rotor having peripheral poles 52 and an axial stem 53 fast to shaft 50. Stationary coils 54 and 55 are associated with the poles 52 and stem 53 respectively, the coil 55 being energized by battery 56 to polarize poles 52 and also to pull upwardly on stem 53 thereby to cause the shaft 50 to rest lightly on bearing 57. The coils 54 are connected to amplifier A3 through circuit 58 containing switch 59. Associated with disk 49 are electro-magnets 60 connected to a variable source of alternating current 61 through circuit 62 containing condenser 63 to throw magnets 60 out of phase with each other and switch 64. The circuit 58 may also be connected to electro-magnets associated with disk 49 and in the drawing this circuit is connected to electro-magnets 65 other than magnets 60 through circuit 66 containing switch 67, a condenser 75 being connected in series with one of the electro-magnets 65 to produce the necessary phase displacement.

In transmitting, motor 2 drives the drum 1 at a speed proportional to the frequency of the alternating current from generator 6 and the light from source 9 traces a spiral around the periphery of the drum as the latter is threaded along shaft 5. The alternating current from generator 6, acting upon the grid of audion 13, causes pulsations of impulses to be transmitted from the transmitting station to the receiving station, either by wire or by radio. The light reflected from the subject-matter on drum 1 to the photoelectric cell varies the resistance of circuit 16 in accordance with variations in the reflection ability of the successive points of the subject-matter. This variation of resistance in circuit 16 varies the potential on grid 14 and thereby varies the aforesaid impulses.

It has been found that by varying the potential of battery 20 either like or opposite reproduction can be effected, that is, either a positive or a negative can be produced at the receiving station when using a negative (or a positive) at the transmitting station. For example, like reproduction has been attained with twenty volts and opposite reproduction with ten volts. This is due to the fact that under the respective conditions opposite effects are produced by the pulsating potential impressed upon grid 14 by transformer 7 when the plate potential is varied. A theory explanatory of this mode of operation is set forth in copending application Serial No. 755,337, filed Dec. 11, 1924, now Patent No. 1,593,651, granted July 27, 1926, in which application this method of like or opposite reproduction is claimed.

At the receiving station said varying impulses vary the potential on grid 46 thereby varying the effective resistance of circuit 42 and varying the intensity of the oscillations in circuit 30. When no impulse is acting upon grid 46 the resistance of the modulator is sufficient to prevent oscillations or at least render the oscillations so feeble as to be ineffective. When an impulse is acting upon grid 46 the resistance is lowered sufficiently to permit oscillations, the intensity of the oscillations being proportional to the intensity of the impulse. The oscillating circuit 30 is preferably adjusted to generate oscillations of high-frequency and high-potential adapted to produce an electronic discharge (e. g. a corona discharge) from needle 29 when above a predetermined intensity higher than that existing between successive impulses, the intensity of the discharge depending upon the excess of oscillation intensity above the predetermined intensity, whereby an electronic discharge is emitted from needle 29 during each impulse (except perhaps while recording a white or an extremely light representation on the receiving paper.) Thus, in transmitting a half-tone, a dot (or short dash) is recorded on the receiving paper at each impulse, the dot varying in intensity in response to variations in the intensity of said impulses, and in transmitting extreme contrasts such as the black and white of printed matter, at each impulse during passage of black or white (depending upon the adjustment of the transmitting apparatus as above described) past the point of incidence of the light from source 9.

The recording paper may be of the type requiring development subsequent to exposure by the electronic discharge to convert the latent image into a patent image or it may be of the type in which a patent image is produced without development, the latter type having the advantage of displaying the image as it is recorded. The electronic discharge produces the exposure as a result of its light and/or heat and/or electronic bombardment of the photographic emulsion.

The receiving drum 23 is driven at approximately the speed of the transmitting drum 1 by the eddy-current motor comprising disk 49, the current in coils 60 being adjusted to such quantity and phase relation as to overcome the average resistance of the parts driven thereby, and the aforesaid impulses of current synchronize the drum 23 with drum 1 by recurrently energizing magnets 54 at the frequency of the transmitting current. The poles 52 are so distributed that one pole passes each magnet 54 during each impulse. If the motor 49 is driving the drum 23 at synchronous speed the alternate advancing and retarding effects of the magnets 54 cancel, whereas if motor 49 tends to drive drum 23 too slow or too fast either the advancing or the retarding effect of magnets 54 predominates to maintain the drum in synchronism.

By closing switch 67 power is supplied to motor 49 in proportion to the intensity of the transmitting impulses, and the power of the eddy-current motor is thereby varied in accordance with the current synchronous motor 51—54, thus more effectively holding the drum in synchronism during wide variations in the intensity of the transmitting impulses.

While I have shown for purposes of illustration, a system in which the subject-matter is sent by modulating the synchronizing pulsations it will be understood that in its broader aspect the present invention is independent of whether or not the subject-matter is transmitted by modulating these pulsations or other pulsations. For example, a second generator 6' may be connected with the plate circuit 19 through transformer 7' for producing synchronizing pulsations of different frequency, in which case the receiving apparatus is adjusted to respond to these pulsations and the pulsations produced by generator 6 have no effect upon the synchronizing apparatus owing to their different frequency. It will also be understood that this invention is applicable to multiplex systems wherein a plurality of images or signals are sent simultaneously by modulating different pulsations of different frequencies and/or beat frequencies according to the different subject-matter respectively.

This application is a division of application Serial No. 755,336, filed December 11, 1924, now Patent No. 2,015,742, granted Oct. 1, 1935; and also of application Serial No. 521,665, filed March 11, 1931.

What is claimed is:

1. The method of synchronizing picture transmission apparatus which comprises driving the transmitting apparatus at a speed determined by the frequency of the carrier current, and controlling the speed of the receiving apparatus by the modulated carrier current.

2. Means for receiving an image represented by a modulated carrier current including a motor, and means for applying said modulated carrier current to control the speed of said motor.

3. The method of synchronizing apparatus at two places between which transmission is effected by modulated carrier current, which consists in determining the speed of the apparatus at both places in accordance with the carrier frequency.

4. The method of synchronizing the transmitting and receiving apparatus in a modulated carrier current communication system, which consists in determining the speed of both the transmitting and receiving apparatus in accordance with the frequency of the carrier current.

5. In the transmission of pictures by means of a modulated carrier current, the method of synchronizing the transmitting and receiving apparatus which consists in driving the transmitting apparatus at a speed determined by the speed of the carrier current generator and at the receiving end controlling the speed of the receiving apparatus by the carrier component of the modulated received current.

6. Means for synchronizing apparatus at two places between which a carrier current transmission is effected comprising respective motors at the places, and means at each place to correlate the motor speed with the carrier frequency.

7. The method of controlling a motor such as used in radiographic apparatus, which consists in affecting the speed of the motor by the application to the motor of energy controlled by a continuous series of high-frequency photoelectric impulses of variable intensity and equal duration.

8. The method of controlling the speed of a motor such as used in radiographic apparatus, which consists in applying to the motor energy controlled by impulses of equal duration and of variable intensity.

AUSTIN G. COOLEY.